United States Patent [19]

Hohn et al.

[11] Patent Number: 4,791,172

[45] Date of Patent: Dec. 13, 1988

[54] PROCESS FOR THE PREPARATION OF PARTIALLY HYDROGENATED NITRILE RUBBERS

[75] Inventors: Johann Hohn, Dormagen; Franz-Josef Mersmann, Bergisch Glasbach; Werner Obrecht, Moers; Zsolt Szentivanyi, Leverkusen, all of Fed. Rep. of Germany

[73] Assignee: Bayer Aktiengesellschaft, Leverkusen - Bayerwerk, Fed. Rep. of Germany

[21] Appl. No.: 103,661

[22] Filed: Oct. 2, 1987

[30] Foreign Application Priority Data

Oct. 14, 1986 [DE] Fed. Rep. of Germany ....... 3634882

[51] Int. Cl.$^4$ ................................................ C08L 9/02

[52] U.S. Cl. .................................... 525/234; 525/238; 525/239

[58] Field of Search ............... 525/234, 235, 233, 238, 525/239

[56] References Cited

U.S. PATENT DOCUMENTS

| | | | |
|---|---|---|---|
| 4,350,796 | 9/1982 | Oyama et al. | 525/235 |
| 4,421,884 | 12/1983 | Oyama et al. | 525/234 |
| 4,491,621 | 1/1985 | Okumo et al. | 525/235 |

*Primary Examiner*—Allan M. Lieberman
*Attorney, Agent, or Firm*—Connolly and Hutz

[57] ABSTRACT

The invention relates to a process for the preparation of partially hydrogenated nitrile rubbers with defined residual double bond contents of between 2.0 and 5.0%, preferably 3.0 and 4.5%.

2 Claims, No Drawings

PROCESS FOR THE PREPARATION OF PARTIALLY HYDROGENATED NITRILE RUBBERS

The invention relates to a process for the preparation of partially hydrogenated nitrile rubbers with defined residual double bond contents of between 2.0 and 5.0%, preferably 3.0 and 4.5%.

It is known, for example from EP-A-O, 134,023, to hydrogenate the double bonds of acrylonitrile/butadiene copolymers (nitrile rubber). As a result of the hydrogenation, a particularly high-grade rubber is obtained which is usually vulcanized with peroxides. It has been found that, for certain fields of application, the sulphur vulcanization known for nitrile rubber is to be preferred. For this purpose, however, it is necessary that not all the double bonds of the nitrile rubber are hydrogenated during the hydrogenation, but that residual double bond contents of 2 to 5% are preserved.

Since, on the one hand, a large excess of hydrogen is used for hydrogenation but, on the other hand, the hydrogenation catalyst does not always have the same activity from batch to batch, the residual double bond contents of the hydrogenated products show a large deviation from the predetermined set value, for example 4±2%. Excessively hydrogenated products can no longer be vulcanized with sulphur to give mouldings having adequate strength properties; insufficiently hydrogenated products do not have an adequate ageing resistance.

It has now been found that, without a loss of quality, partially hydrogenated nitrile rubbers with only a slight deviation from the predetermined residual double bond content can be prepared when at least two partially hydrogenated nitrile rubbers with different degrees of hydrogenation above and below the predetermined set value are mixed, adhering to certain limits with respect to the residual double bond contents of the components which are to be mixed.

The invention therefore relates to a process for the preparation of partially hydrogenated nitrile rubbers with residual double bond contents of between 2.0 and 5.0%, preferably 3.0 and 4.5%, which is characterized in that at least two partially hydrogenated nitrile rubbers with residual double bond contents of 1.5 to 7.5%, the residual double bond content of one nitrile rubber being above and the residual double bond content of the other nitrile rubber being below the predetermined set value, are mixed in suitable ratios, at most 25% by weight of partially hydrogenated nitrile rubbers with residual double bond contents of 5 to 7.5% being incorporated in the mixture.

Each of the rubbers to be mixed in is preferably used in a quantity of at least 10% by weight of the total mixture.

The nitrile rubbers contain in general 85 to 50% by weight, preferably 82 to 55% by weight, of a conjugated diene, 15 to 50% by weight, preferably 18 to 45% by weight, of an unsaturated nitrile and 0 to 10% by weight, preferably 0 to 8% by weight, of at least one further monomer which is copolymerizable with the conjugated diene and the unsaturated nitrile.

Examples of possible conjugated dienes are 1,3-butadiene, 2-methyl-1,3-butadiene, 2,3-dimethyl-1,3-butadiene and 1,3-pentadiene, and possible unsaturated nitriles are acrylonitrile and methacrylonitrile.

Possible further monomers are vinylaromatics such as styrene, o-, m- or p-methylstyrene, ethylstyrene, vinylnaphthalene and vinylpyridine, $\alpha,\beta$-unsaturated monocarboxylic acids having 3 to 5 C atoms, such as acrylic acid, methacrylic acid and propionic acid, as well as $\alpha,\beta$-unsaturated dicarboxylic acids having 4 to 5 C atoms, such as maleic, fumaric, citraconic and itaconic acid, and also vinyl chloride, vinyllidene chloride, N-methylolacrylamide and vinyl alkyl ethers having 1 to 4 C atoms in the alkyl moiety.

Preferably, partially hydrogenated copolymers of butadiene and acrylonitrile are used. The molecular weight of the polymers is not critical and is between 500 and 500,000 g/mol, preferably between 1000 and 200,000 g/mol and especially between 30,000 and 150,000 g/mol (number averages, determined by gel permeation chromatography).

The hydrogenation can be carried out by known processes.

Mixing is preferably carried out with the rubbers in the form of polymer solutions or in the form of polymer latices. However, it can also be carried out in bulk on a suitable kneader unit.

For the production of mouldings, sulphur or conventional sulphur donors and optionally further auxiliaries and fillers, for example vulcanization accelerators, anti-ageing agents, carbon black and processing aids, are added to the polymer mixes.

Due to their excellent resistance to weathering, ozone, altitude and hot air, and to their resistance to a cold climate, these polymers can be used for high-grade rubber articles such as seals, tubing, membranes, drive belts, cable insulations and cable sheaths.

EXAMPLES

Rubber mixes were prepared in accordance with the following formulation:
100 parts by weight of rubber
30 parts by weight of N 550 carbon black
5 parts by weight of zinc oxide
7 parts by weight of magnesium oxide
3 parts by weight of the Zn salt of 2-mercaptobenzimidazole
1.5 parts by weight of styrolized diphenylamine
0.5 part by weight of stearic acid
0.1 part by weight of sulphur paste (80% by weight of sulphur, 20% by weight of a mixture of fatty acid salts)
4.5 parts by weight of tetramethylthiuram disulphide
2.7 parts by weight of 2-(4-morpholinyldithio)-benzothiazole
1.0 part by weight of dibenzothiazyl disulphide.

The following rubbers were used, all of which were acrylonitrile/butadiene copolymers with 33% by weight of acrylonitrile:
H-NBR-I with a residual double bond content of 3.2%
H-NBR-II with a residual double bond content of 1.4%
H-NBR-III with a residual double bond content of 7.5%
H-NBR-IV with a residual double bond content of 4.0%
H-NBR-V with a residual double bond content of 2.0%
The following results were obtained:

|  | 1 | 2 | 3 | 4 | 5 |
|---|---|---|---|---|---|
| H-NBR - I | 100 | — | — | — | — |
| H-NBR - II | — | 70 | 50 | — | — |

| | 1 | 2 | 3 | 4 | 5 |
|---|---|---|---|---|---|
| H-NBR - III | — | 30 | 50 | — | 22 |
| H-NBR - IV | — | — | — | 100 | — |
| H-NBR - V | — | — | — | — | 78 |
| Residual double bond content (%) | 3.2 | 3.2 | 4.4 | 4.0 | 3.2 |
| Mooney scorch 120° C. | 37 | 37 | 33 | 37 | 35 |
| Mooney scorch 140° C. | — | — | — | — | — |
| Vulcameter 170° C. | | | | | |
| t 10 | 4.3 | 4.1 | 4.0 | 4.4 | 4.2 |
| t 70 | 6.1 | 5.8 | 5.6 | 6.2 | 6.0 |
| t 90 | 6.9 | 6.5 | 6.3 | 6.9 | 6.7 |
| F min | 127 | 443 | 150 | 148 | 146 |
| F max | 4093 | 4080 | 4145 | 4115 | 4044 |
| F max - F min | 3966 | 3937 | 3995 | 3967 | 3898 |
| Vulcanization 15 min | 170° C. | 170° C. | 170° C. | 170° C. | 170° C. |
| Bar II | | | | | |
| Tensile strength | 32.2 | 30.6 | 28.0 | 32.1 | 31.8 |
| Elongation at break | 510 | 500 | 480 | 510 | 500 |
| Strain at 50% | 1.4 | 1.5 | 1.5 | 1.5 | 1.4 |
| Strain at 100% | 2.5 | 2.5 | 2.7 | 2.4 | 2.2 |
| Strain at 150% | 4.0 | 4.4 | 4.6 | 4.0 | 3.7 |
| Pohle structure | 174 | 143 | 142 | 146 | 145 |
| Hardness 20° C. | 64 | 65 | 66 | 65 | 65 |
| Hardness 70° C. | 64 | 65 | 66 | 65 | 65 |
| Elasticity 20° C. | 34 | 33 | 33 | 32 | 34 |
| Elasticity 70° C. | 64 | 64 | 64 | 64 | 63 |
| Hot air ageing 7 + 14 days, cellular oven at 150° C. | | | | | |
| Tensile strength | | | | | |
| 0 | 32.2 | 30.6 | 28.0 | 32.1 | 31.8 |
| 7 | 23.6 | 22.5 | 19.1 | 24.8 | 23.3 |
| 14 | 22.0 | 24.6 | 20.0 | 23.4 | 22.5 |
| Elongation at break | | | | | |
| 0 | 510 | 500 | 480 | 510 | 500 |
| 7 | 280 | 250 | 200 | 320 | 290 |
| 14 | 180 | 190 | 125 | 195 | 180 |
| Strain at 50% | | | | | |
| 0 | 1.4 | 1.5 | 1.5 | 1.5 | 1.4 |
| 7 | 3.4 | 4.4 | 4.2 | 3.7 | 3.6 |
| 14 | 5.7 | 7.3 | 7.8 | 5.6 | 5.8 |
| Strain at 100% | | | | | |
| 0 | 2.5 | 2.5 | 2.7 | 2.4 | 2.2 |
| 7 | 7.7 | 9.3 | 9.2 | 7.8 | 7.5 |
| 14 | 13.5 | 16.6 | 17.4 | 13.8 | 13.7 |
| Strain at 150% | | | | | |
| 0 | 4.0 | 4.4 | 4.6 | 4.0 | 5.7 |
| 7 | 13.1 | 15.7 | 15.7 | 13.4 | 13.4 |
| 14 | 20.3 | 22.6 | — | 20.2 | 20.8 |
| Hardness 20° C. | | | | | |
| 0 | 64 | 65 | 66 | 65 | 65 |
| 7 | 74 | 76 | 77 | 76 | 75 |
| 14 | 80 | 83 | 84 | 82 | 81 |
| Heat treatment | 6 hours at 150° C. | | | | |
| Compression set DIN A 2 | | | | | |
| 70 hours/20° C. | 18.3 | 19.2 | 18.4 | 19.6 | 20.3 |
| 70 hours/70° C. | 44.3 | 44.6 | 42.8 | 46.2 | 47.0 |
| 70 hours/100° C. | 69.4 | 69.8 | 67.9 | 73.7 | 69.8 |

We claim:

1. Process for the preparation of partially hydrogenated nitrile rubbers with residual double bond contents of between 2.0 and 5.0% characterized in that at least two partially hydrogenated nitrile rubbers with residual double bond contents of 1.5 to 7.5%, the residual double bond content of one nitrile rubber being above and the residual double bond content of the other nitrile rubber being below the predetermined set value, are mixed in amounts such that each of the individual rubbers is at least 10% by weight of the total mixture, the nitrile rubbers contain 85 to 50% by weight of a conjugated diene, 15 to 50% by weight of an unsaturated nitrile and 0 to 10% by weight of at least one further monomer which is copolymerizable with the conjugated diene and the unsaturated nitrile, and at most 25% by weight of partially hydrogenated nitrile rubbers with residual double bond contents of 5 to 7.5% are incorporated in the mixture.

2. Process according to claim 1 wherein partially hydrogenated rubbers with residual double bond contents of 3.0 to 4.5% are produced.

* * * * *